Patented Sept. 26, 1950

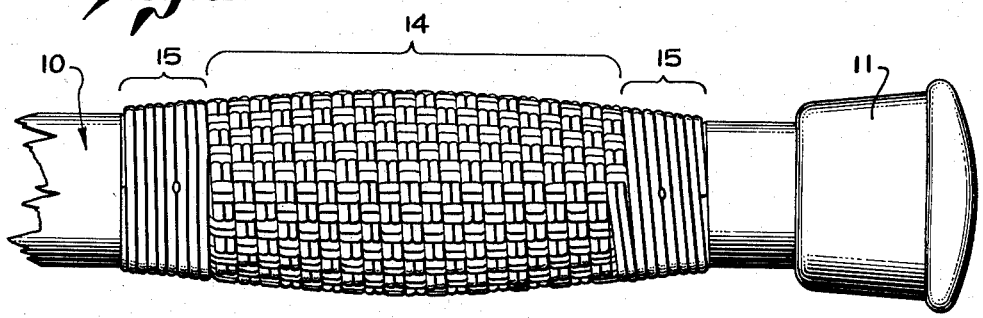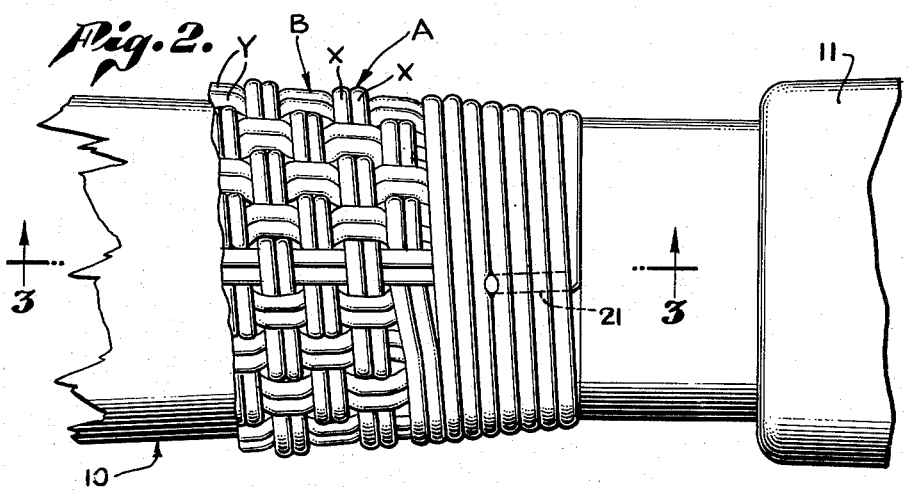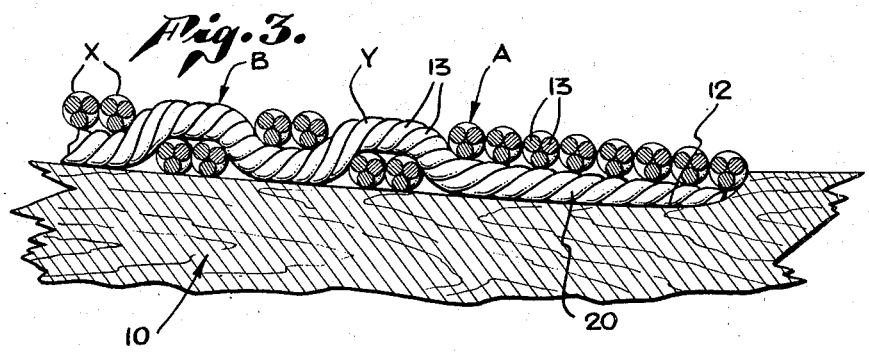

2,523,637

UNITED STATES PATENT OFFICE 2,523,637

GRIP FOR HANDLES OF POLES, CLUBS, AND LIKE ARTICLES

Dow F. Stanfield and Eliseo Lopez, Jr., Los Angeles, Calif.

Application November 15, 1946, Serial No. 709,916

7 Claims. (Cl. 16—110)

This invention has to do with a grip for handles of poles, clubs and like articles, and it is a general object of the invention to provide a grip of simple, practical and inexpensive construction applicable to handles generally, and particularly suited for the handles of poles, clubs, and like articles.

A general object of the present invention is to provide a grip formed of a plurality of members preferably in the nature of cords, which grip presents a surface to be comfortably and securely engaged by the hand of a user.

A general object of the present invention is to provide a grip which applied to a handle forms a neat, sightly surface, the texture of which is such that a person's hand will not slip thereon even when moisture is present.

It is a further object of the invention to provide a grip of the general character referred to which involves a plurality of members such as cords extending lengthwise of the handle, and a single member or cord spirally wrapped from one end of the grip to the other.

A further object of this invention is to provide a grip of the general character referred to having a main or central portion where the members forming the grip are woven together and having ends at which the circumferential member is wrapped around the ends of the longitudinal or axial members to completely cover them and to effectively confine them to the handle.

The various objects and features of our invention will be fully understood from the following detailed description of a typical preferred form and application of the invention, throughout which description reference is made to the accompanying drawings, in which:

Fig. 1 is a side elevation of a typical handle showing the grip of the present invention applied thereto. Fig. 2 is an enlarged view showing the details of a portion of the handle and grip shown in Fig. 1 and Fig. 3 is an enlarged detailed sectional view taken as indicated by line 3—3 on Fig 2.

The grip of the present invention is applicable, generally, to handles. However, since it is particularly useful and practical as applied to the handles of fishing poles or the like we have chosen to illustrate it as applied to the handle of a fishing pole and will refer to it in that connection, it being understood that such reference and illustration is not to be taken as a limitation upon the invention. In the drawings, the handle 10 of a fishing pole is shown provided with the grip of the present invention and its end is shown covered by a suitable tip 11. The handle 10 is shown formed of wood although it may, in practice, be formed of any suitable material. Where the grip of the present invention is applied the handle is preferably round in cross section and as shown in the drawings it is preferably formed with a recess 12 to which the grip is confined. The surface of the handle to which the grip is applied and which is formed by the bottom of the recess is preferably crowned somewhat so that it is slightly larger in diameter midway between the ends of the recess in order to give the grip a comfortable contour such as is illustrated in Fig. 1 of the drawings.

The grip that we have provided is preferably formed entirely of a single spirally wrapped member which we will term a circumferential member A and a plurality of longitudinal members or elements B which extend straight lengthwise of the grip except that they may bow outwardly somewhat in conforming to the crowned contour of the handle portion to which the grip is applied. These longitudinal members will be referred to as axial members in that they extend axially of the grip construction. Each member of the grip hereinabove referred to may be formed of one or more cords or the like and it will be understood that the cords may be of any suitable size, form or material, depending upon the character of grip desired. In the drawings we have illustrated a construction which we have found to be practical and in this case the circumferential member is made up or formed of two cords X arranged side by side while each longitudinal or axial member B is made up of two cords Y arranged side by side. Where the cords are formed of fibrous material such as cotton or the like they may be made up of strands so that each cord is formed of a plurality of strands suitably wrapped or twisted together in accordance with construction commonly followed in the manufacture of products of this type. In the drawings, for instance, as shown in Fig. 3, each of the cords is made up of a plurality of spirally wrapped strands 13.

In accordance with our construction the grip is divided into a middle or main portion designated at 14 in Fig. 1, and end portions designated at 15 in Fig. 1. The portions 14 and 15 adjoin each other to form a continuous structure or grip and where the handle to which the grip is applied is provided with a recess 12 it is preferred that the parts 14 and 15 be such as to extend the full length of the recess or, in other words, from one end to the other of the recess, as shown in the drawings. In accordance with our construction the portions 15 occurring at the ends of the grip are distinctly different in formation from the middle portion 14 yet they are sufficiently similar in texture so that they form effective continuations of the portion 14 convenient to the hand of the user. In general the middle portion 14 is of woven construction presenting a rather rough surface while the end portions 15 are fully wrapped so that they present surfaces that are somewhat rough but not as coarse or rough as that presented by portion 14.

The main portion 14 is formed by weaving together the members A and B and although we may provide various forms of weaving so that the weaving or lacing together of the members is more or less intricate, we prefer in practice to employ a simple square weave. To provide a simple yet highly practical weave adjacent turns of the circumferential member A are spaced apart somewhat while the axial members are woven in and out between adjacent turns of member A to extend alternately under and over the member A. Further, adjacent axial members B are oppositely related to the circumferential member A so that where one axial member B passes over the circumferential member A the adjoining axial members B pass under it. It is believed that this simple weaving together of the members A and B will be clearly understood from an examination of the drawings.

At each end portion 15 the ends 20 of the axial members continue on from the main portion 14 and lie adjacent the handle or the bottom of the recess 12 where they may be somewhat spread or flattened, as indicated in Fig. 3 of the drawings. It is preferred to terminate the end portions 20 of members B uniformly at or close to the ends of the grip and where the handle is recessed it is preferred that they be extended to the ends of the recess. At each end portion 15 the circumferential member A woven with the axial members at the middle portion continues to be spirally wrapped and as it wraps around the portion 15 adjacent turns are preferably tight or close together and applied tightly around the ends 20 of the axial portions, to securely bind them to the handle. The end or tip portion 21 of the circumferential member A occurring at the outer end of an end portion 15 may be made fast in any suitable manner. However, we prefer that it be retained under a few of the endmost turns of the member A as shown throughout the drawings. Where member A is made up of more than one cord it is preferred that the several cords be turned under at different points around the grip. For instance, if two cords are employed they can be advantageously turned under at diametrically opposite points.

In applying the members A and B to a handle they are woven together and wrapped so that they are firm or tight on the handle and consequently grip it securely. Further, we may, if desired, apply a suitable adhesive to the surface of the handle to which the grip is applied in order to bond the members A and B to the handle wherever they touch it or adjoint it. Such an adhesive may be a varnish or a lacquer or a suitable cement. Also it will be understood that after the handle has been completely formed it may be coated or treated with a suitable preservative or finishing material as for instance it may be oiled or varnished or otherwise treated.

It will be understood, of course, that in any particular case the particular treatment employed will depend upon the service to which the structure is to be put and upon the material out of which the members are formed. Ordinarily the members A and B will be formed of cords, in which case the grip can be made particularly slightly and pleasing in appearance by using cords of different colors or even by using cords the strands of which are variously colored.

From the foregoing description it will be apparent that we have, by our present invention, provided a grip wherein the element relied upon to maintain it on the handle is a single continuous element, the circumferential member A, which extends continuously from one end of the grip to the other. The structure involves a plurality of individual or separate axial members B. However, the end portions of these members are effectively held or bound to the handle at the end portions 15 where the circumferential member A is not only tightly wrapped with adjacent convolutions together, but is tightly wrapped on the handle so that the end portions 20 of members B are anchored against displacement. When the handle is in use the woven central portion 14 presents a surface of a rather rough texture which is free of corners or angular parts to injure or cause discomfort to the hand of the user but which is sufficiently rough so that the hand will not slip on it even though moisture may be present. It is intended that the middle portion 14 be the primary grip portion to be engaged by the hand of the user. However, the end portions 15 being of wrapped cords have a surface comfortable to the hand and such that the hand will not slip thereon.

Having described only a typical preferred form and application of our invention, we do not wish to be limited or restricted to the specific details herein set forth, but wish to reserve to ourselves any variations or modifications that may appear to those skilled in the art and fall within the scope of the following claims.

Having described our invention, we claim:

1. In combination an elongate, round, rigid handle and a grip on the handle including, a single member spirally wound circumferentially around the handle, and a plurality of elements extending axially of the handle and each woven with said member at the middle portion of the grip and completely confined beneath the circumferential member at both ends of the grip, adjacent turns of said member being tight together at both ends of the grip.

2. In combination an elongate, round, rigid handle and a grip on the handle including, a single member spirally wound circumferentially around the handle, and a plurality of elements extending axially of the handle, each woven with said member at the middle portion of the grip and completely confined beneath said member at both ends of the grip, said member including a plurality of cords in side by side relation.

3. In combination an elongate, round, rigid handle and a grip on the handle including, a single member spirally wound circumferentially around the handle, and a plurality of elements extending axially of the handle and each woven with said member at the middle portion of the grip and completely confined beneath said member at both ends of the grip, each axial element including a plurality of cords in side by side relation.

4. In combination an elongate, round, rigid handle and a grip on the handle including, a single member spirally wound circumferentially around the handle, and a plurality of elements extending axially of the handle and each woven with said member at the middle portion of the grip and completely confined beneath said member at both ends of the grip, said member and each axial element including a plurality of cords in side by side relation.

5. In combination an elongate, round, rigid handle and a grip on the handle including, a single member spirally wound circumferentially around the handle, and a plurality of elements extending longitudinally of the handle and woven with said member at the middle portion of the grip so that each element passes alternately over and under the turns of said member, said elements which are adjacent each other being oppositely related to said member, the end portions of said elements being completely confined beneath said member at both ends of the grip.

6. In combination, an elongate, rigid, round handle having an annular recess therein, and a grip confined to the recess and including a single member spirally wound circumferentially around the handle, and a plurality of elements extending axially of the handle and each woven with said member at the middle portion of the grip and completely confined beneath said member at the ends of the grip.

7. In combination, an elongate, rigid, round handle having an annular recess with a crowned bottom and a grip completely occupying the recess and including a single member spirally wound circumferentially around the handle, and a plurality of elements extending axially of the handle and each woven with said member at the middle portion of the grip and completely confined beneath said member at the ends of the grip.

DOW F. STANFIELD.
ELISEO LOPEZ, Jr.

REFERENCES CITED

The following references are of record in the file of this patent:

UNITED STATES PATENTS

| Number | Name | Date |
|---|---|---|
| 573,796 | Rockwell | Dec. 22, 1896 |
| 604,706 | Wiens et al. | May 24, 1898 |

FOREIGN PATENTS

| Number | Country | Date |
|---|---|---|
| 7,004 | Great Britain | Apr. 1, 1899 |
| 13,285 | Great Britain | June 16, 1896 |

OTHER REFERENCES

Seamanship (Textbook) by S. B. Luce, revised by A. Ward (Van Nostrand Company) 1895, plates 22 and 23, pages 48, 49 and 50.